US008161615B2

(12) United States Patent
Borner et al.

(10) Patent No.: US 8,161,615 B2
(45) Date of Patent: Apr. 24, 2012

(54) APPARATUS AND METHOD FOR CLAMPING AND PROCESSING CONVEYOR BELT ENDS AND THE LIKE

(75) Inventors: Gerhard Borner, Wiesbaden (DE); Thomas Wilk, Muhlheim (DE)

(73) Assignee: Mato Maschinen-Und Metallwarenfabrik Curt Matthaei GmbH & Co. KG, Offenbach (DE)

( * ) Notice: Subject to any disclaimer, the term of this patent is extended or adjusted under 35 U.S.C. 154(b) by 855 days.

(21) Appl. No.: 12/231,621

(22) Filed: Sep. 4, 2008

(65) Prior Publication Data

US 2009/0074544 A1 Mar. 19, 2009

(30) Foreign Application Priority Data

Sep. 14, 2007 (EP) .................................... 07018147

(51) Int. Cl.
*B23P 11/00* (2006.01)
*B65H 27/00* (2006.01)

(52) U.S. Cl. .................................... 29/432; 414/226.01

(58) Field of Classification Search .................... 29/432, 29/426.1, 426.4–426.6, 428; 414/226.01, 414/806; 83/869, 875, 935, 861–865
See application file for complete search history.

(56) References Cited

U.S. PATENT DOCUMENTS

| | | | |
|---|---|---|---|
| 4,315,450 A | 2/1982 | Pray | |
| 5,020,209 A | 6/1991 | Fullard | |
| 5,170,924 A | 12/1992 | Musil | |
| 5,499,565 A | 3/1996 | Hansen et al. | |
| 7,735,404 B2 * | 6/2010 | Wilk | 83/869 |
| 2007/0283796 A1 | 12/2007 | Wilk | |

FOREIGN PATENT DOCUMENTS

| | | |
|---|---|---|
| DE | 4002116 A1 | 8/1990 |
| DE | 19531781 A1 | 3/1996 |
| EP | 0427428 A1 | 5/1991 |
| EP | 1849568 A1 | 10/2007 |
| GB | 2227703 A | 8/1990 |
| WO | 9607517 A1 | 3/1996 |

OTHER PUBLICATIONS

European No. 07 01 8147 Search Report dated Dec. 14, 2007 (1 page).

* cited by examiner

*Primary Examiner* — John C Hong
(74) *Attorney, Agent, or Firm* — Price Heneveld LLP

(57) ABSTRACT

An apparatus and method for clamping and processing conveyor belt ends includes a stationary stand and a clamping member supported on the stand and configured to selectively retain an associated conveyor belt end therein. A belt processing member is configured to process the conveyor belt end retained in the clamping member, and a rail is detachably mounted on one of the stand member and the clamping member, and movably supports thereon the belt processing member for movement of the same along the conveyor belt end retained in the clamping member.

15 Claims, 12 Drawing Sheets

APPARATUS AND METHOD FOR CLAMPING AND PROCESSING CONVEYOR BELT ENDS AND THE LIKE

CLAIM OF PRIORITY

Applicants hereby claim the priority benefits under the provisions of 35 U.S.C. §119, basing said claim of priority on European Patent Application Serial No. 07 018 147.4, filed Sep. 14, 2007. In accordance with the provisions of 35 U.S.C. §119 and Rule 55(b), a certified copy of the above-listed European patent application will be filed before grant of a patent.

BACKGROUND OF THE INVENTION

The invention relates to an appliance or apparatus for clamping and processing conveyor belt ends or the like and to a related method.

DE 40 02 116 A1 describes an appliance for clamping and processing one end of a conveyor belt. This appliance has a stand, a clamping device for the conveyor belt and a processing device for the conveyor belt, the said processing device being designed as a belt plane or skiver. This belt plane is movable transversely with respect to the longitudinal extent of the conveyor belt and thus makes it possible to plane off a covering layer from the conveyor belt.

In the replacement or renewal of belt connectors at one end of a conveyor belt or at both ends of the conveyor belt, it is necessary to skive or sever the opposite faces of the conveyor belt along its transverse extent at a distance from the belt connectors and associated belt end, and to connect new belt connectors to the conveyor belt after the covering layers of the conveyor belt have been removed. The removal or separation of the covering layers from the ends of the belt takes place by means of a belt plane or skiver. The attachment of the belt connectors takes place by means of press-in pincers, wherein one or more belt connectors are simultaneously connected to the conveyor belt end at the area of reduced thickness.

The width, length and thickness of conveyor belts used for the conveyance of mineral resources, for example for the conveyance of hard coal, are considerable. Consequently, the weight of the belt is high, and, in the event of a repair of the belt on site, several persons are required to carry out the individual processing operations. Thus, it is necessary to unclamp the conveyor belt between the various processing operations, with the result being that the belt has to be handled, positioned and clamped anew in a relatively complicated and particularly ergonomically unfavorable manner. This is also a disadvantage from the point of view of the exact orientation and attachment of the belt connectors at the belt end.

The disadvantages described are notable in the belt plane according to DE40 02 116 A1.

Furthermore, belt planes are known from U.S. Pat. No. 4,315,450 and WO 96/07517.

SUMMARY OF THE INVENTION

One object of the present invention is to provide an appliance and a method for clamping and processing a conveyor belt end, which substantially simplifies the handling of the conveyor belt and ensures an accurate processing of the end of the conveyor belt.

To achieve this object, the invention proposes an appliance for clamping and processing one end of a conveyor belt, comprising a stand, a clamping device for the conveyor belt, and a processing device for the conveyor belt and a rail. The clamping device is mounted on the stand, and a rail is mounted on either the stand or the clamping device and serves for the movable reception and mounting of the processing device, wherein the rail is releasably connectable to the stand or the clamping device.

The essence of this appliance or apparatus is to be seen in that the rail for the processing device is releasably connectable to the stand or the clamping device. This makes it possible to preserve or maintain the clamped condition of the conveyor belt during the processing operation, in particular during the sequence of processing operations, so that, once the belt has been positioned correctly, it remains in this position and, by virtue of the releasable rail, the respective processing devices can be brought into the desired position along the rail in order to carry out a processing operation on the belt.

One particular advantage of the appliance according to the invention arises when a plurality of processing operations are to be executed on the belt by means of this appliance, for example when the belt is to be planed, in particular both on its top side and on its underside, and when, furthermore, the belt connectors are to be connected to the planed belt end. During all these processing operations, the conveyor belt remains in its clamped position. Moreover, according to the invention, further processing operations may proceed by means of the appliance, such as the cutting of the belt end transversely with respect to its longitudinal extent, in order to generate an exact end face of the belt before the planing of the belt end.

According to one aspect of the invention, where the appliance is concerned, the rail may be mounted on the stand or the clamping device. Consequently, the rail can be releasably connectable to the stand or the clamping device. This depends only on the basic design of the appliance.

The processing device is preferably designed as a cutting implement for cutting the belt end, as a belt plane for separating or removing at least one covering layer of the belt or as an implement for pressing belt connectors into the belt.

It is considered particularly advantageous if the rail is connectable to the stand or the clamping device in different positions, in particular in two or three different positions. These different positions arise, for example, from the fact that a belt plane has to be positioned at another level with respect to the conveyor belt than the press-in pincers for pressing in belt connectors.

Depending on the prevailing conditions, it may be necessary to renew or repair the belt on site in the region of its upper strand or its lower strand. As a rule, the result of this is that the belt plane has to be positioned at different levels when the appliance according to the invention is used. In order to embrace these variants, the rail is connectable to the stand or the clamping device in three different positions.

Thus, by means of the appliance according to the invention, work can be carried out on a stationary conveyor belt. Once the conveyor belt end has been positioned and clamped in a precise manner, further processing operations can readily be carried out on the conveyor belt by one person. This person has merely to position the processing device or the processing devices, which have a markedly lower weight than a belt end to be handled, and can complete the processing operations on the belt by means of such processing devices. Positioning the conveyor belt during introduction into the appliance before clamping, in particular at positioning pins, ensures an exact orientation of the conveyor belt end, and consequently, exact processing of the conveyor belt end as a result of the kinematic, yet positive coupling of one or more processing devices relative to the stand or the clamping device. The uncertainty of an inaccurate belt connector arrangement is eliminated by virtue of the appliance according to the invention.

In one example of the invention, the clamping device has a lower part and an upper part which can be advanced in relation to one another by means of an actuating device, with the rail being releasably connectable to the lower part or to the upper part. In particular, the rail is releasably connectable in a single position to the upper part and in two different positions to the lower part. This arrangement takes into account, in particular, the functioning of the press-in pincers and the two different positions of the belt plane during the planing of the belt along the upper strand or the lower strand.

Preferably, in a first connection position, the rail is arranged at a level which corresponds to the bearing level of the conveyor belt in the clamping device. Preferably, furthermore, in a second or third connection position, the rail is arranged at a level which is different from the bearing level of the conveyor belt in the clamping device. In a second or third connection position of the rail, the latter serves, in particular, for receiving the processing device, in particular the belt plane for the planing of the upper strand or lower strand of the conveyor belt.

In structural terms, the stand or the clamping device is designed, in particular, in such a way that the stand or the clamping device has hole receptacles for the insertion of bearing rods of the rails, and means are provided for fixing, in particular clamping, the rods in the hole receptacles. As a result, the rail can be positioned and fixed in an uncomplicated way in the various hole receptacles of the stand or the clamping device.

There is provision, in particular, for the lower part to be stationary and for the upper part to be advancable. The advance of the upper part takes place, for example, by means of a spindle drive.

Expediently, the rail serves not only for receiving the press-in pincers for the belt connectors and, alternatively, a further processing device, but, moreover, is provided with receptacles for the reception of belt connectors. The contour of the receptacles is adapted to the contour of the belt connectors, so that these can be inserted into the receptacles. This ensures an accurate orientation of the belt connector with respect to the belt before the connecting operation, and a simple and reliable pressing in of the belt connectors by means of the press-in pincers is possible.

Furthermore, the invention proposes a method for clamping and processing an end of a conveyor belt by means of a device described above, the method having the following features:

clamping of the conveyor belt in the region of its end; and
processing of the conveyor belt in the region of its end, to be precise:

a. separation of at least one covering layer from the conveyor belt; and
b. attachment of belt connectors in that region of the conveyor belt from which the covering layer has been separated.

The processing operations "a" and "b" take place while the clamping of the conveyor belt is preserved.

In this method, therefore, there is provision for the clamping to be preserved against movement, and for the processing operations at the end of the belt to proceed during this preserved clamping. These processing operations may also comprise the cutting of the end face of the conveyor belt before method step "a".

According to one aspect of the method, there is provision during the processing of the conveyor belt for processing devices to be moved along a rail, the rail being positioned at different height levels in processing operations "a" and "b". In particular, the rail is arranged during processing operation "a" at a first level and during processing operation "b" at a higher or lower level with respect to the first level.

Further features of the invention are illustrated in the subclaims, in the description of the drawings and in the drawings themselves, while it is noted that all individual features and all combinations of individual features constitute further inventive embodiments.

These and other advantages of the invention will be further understood and appreciated by those skilled in the art by reference to the following written specification, claims and appended drawings.

BRIEF DESCRIPTION OF THE DRAWINGS

The invention is explained in the drawing by means of an exemplary embodiment, without being restricted to this. In the drawing.

DETAILED DESCRIPTION OF THE PREFERRED EMBODIMENTS

Figure 1:
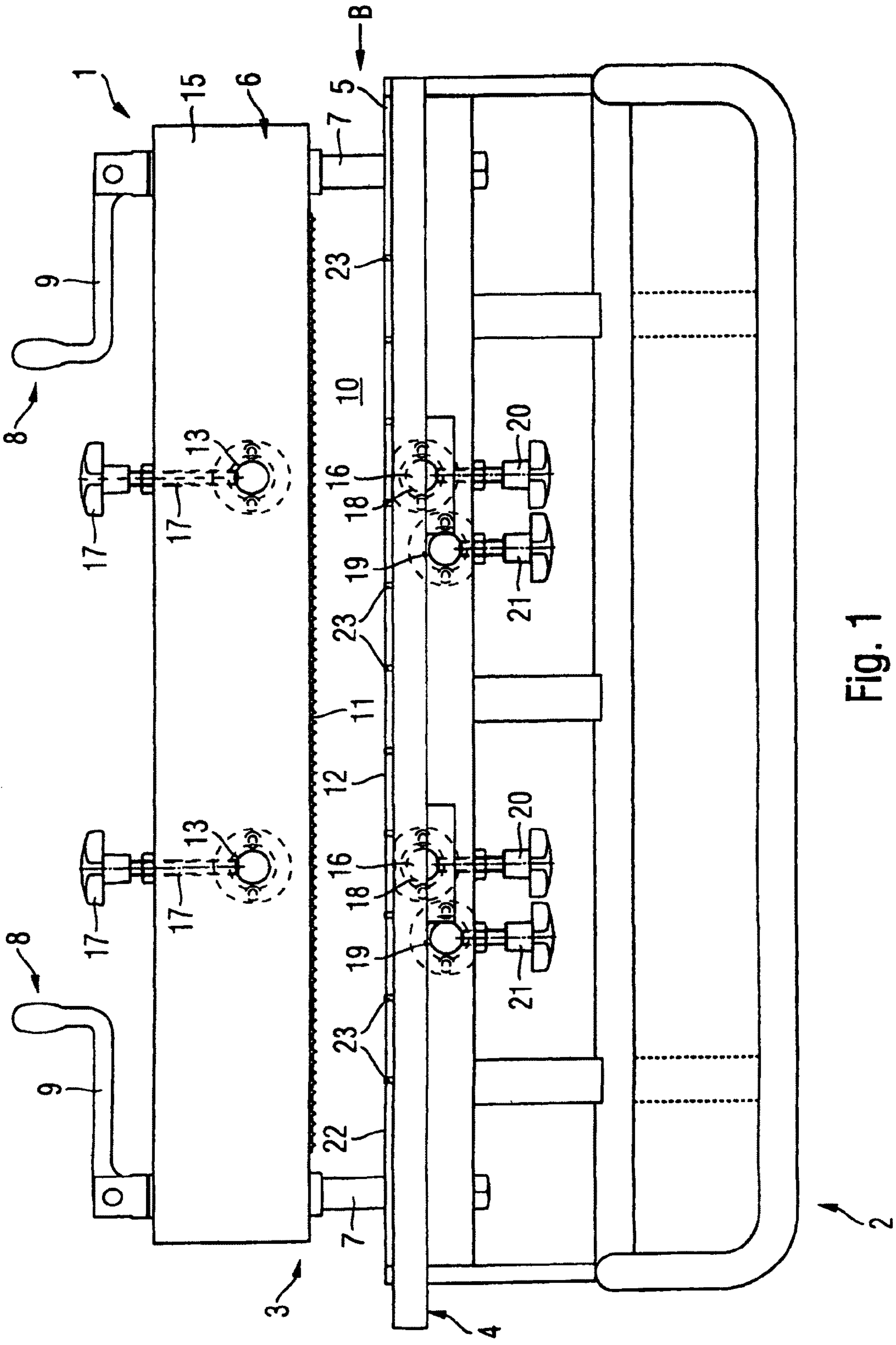
FIG. 1 shows the appliance according to the invention in a first view according to arrow "A" in FIG. 2, illustrated for a first position of the rail.

For purposes of description herein, the terms "upper", "lower", "right", "left", "rear", "front", "vertical", "horizontal" and derivatives thereof shall relate to the invention as oriented in FIGS. 1-6. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1 to 6 illustrate the apparatus or appliance 1 for clamping and processing a conveyor belt (not shown in these figures), a stand 2, a clamping device 3 for the conveyor belt and a processing device (not illustrated in these figures) for the conveyor belt, and also a rail 4.

The clamping device 3 has a lower part 5 mounted stationary on the stand 2 and an upper part 6 mounted displaceably on the lower part 5. Guides 7 serve for the displaceable mounting of the upper part 6 in the lower part 5. The upper part 6 can be advanced with respect to the lower part 5 by means of an actuating device 8. The actuating device 8 has spindle drives (not shown), which can be actuated by means of cranks 9 and which make it possible to advance the upper part 6 parallel to the lower part 5. A space or open cross-sectional area 10 is formed in the clamping device 3 between the guides 7, through which the spindle drives pass, which serve for clamping the conveyor belt. During the corresponding advancing movement of the upper part 6, the conveyor belt is clamped between the lower face 11, having teeth, of the upper part 6 and the upper face 12 of the lower part 5. The two faces 11 and 12 are arranged parallel to one another and horizontally.

The upper part 6 is provided with two hole receptacles 13. The longitudinal extent of the holes formed by the hole receptacles 13 is oriented parallel to the clamping plane of the clamping device 3 and perpendicularly to the main face 15 of the upper part 6. Main face 15 is oriented perpendicularly to the clamping plane of the clamping device 3.

The two hole receptacles 13 are arranged at a distance from one another, and serve for the insertion therein of bearing rods 16, which are connected to the rail 4. In the position illustrated in FIGS. 5 and 6, the bearing rods 16 of the rail 4 are inserted into the hole receptacles 13, and the rail 4 is oriented perpendicularly to the main face 15 of the upper part 6. The bearing rods 16 are inserted into the hole receptacles 13 and can be fixed by means of clamping screws 17 mounted in the upper part 6. Consequently, the rail 4 can be secured in a defined position with respect to the upper part 6.

Correspondingly to the arrangement and nature of the hole receptacles 13, the lower part 5 is provided with two pairs of hole receptacles designated as hole receptacles 18 of one pair and hole receptacles 19 of the other pair. The hole receptacles 18 and 19 are arranged parallel to the hole receptacles 13, and clamping screws 20 are correspondingly assigned to the hole receptacles 18 and clamping screws 21 to the hole receptacles 19. Consequently, the rail 4 cannot only be positioned with its two bearing rods 16 in the hole receptacles 13 and fixed there, but can also be positioned correspondingly in the two hole receptacles 18 and clamped by means of the clamping screws 20 or be positioned in the hole receptacles 19 and clamped by means of the clamping screws 21.

Thus, in the appliance 1 according to the invention, the rail 4 can be arranged in three different positions, a first position, designated as “neutral”, in which the rail 4 is inserted with the bearing rods 16 into the hole receptacles 18 of the lower part 5 and is fixed therein, a second position, designated as “low”, in which the rail 4 is inserted with its bearing rods 16 into the hole receptacles 19 of the lower part 5 and is fixed therein, and finally a third position, designated as “high”, in which the rail 4 is inserted with its bearing rods 16 into the hole receptacles 13 of the upper part 6 and is fixed therein.

Figure 2:
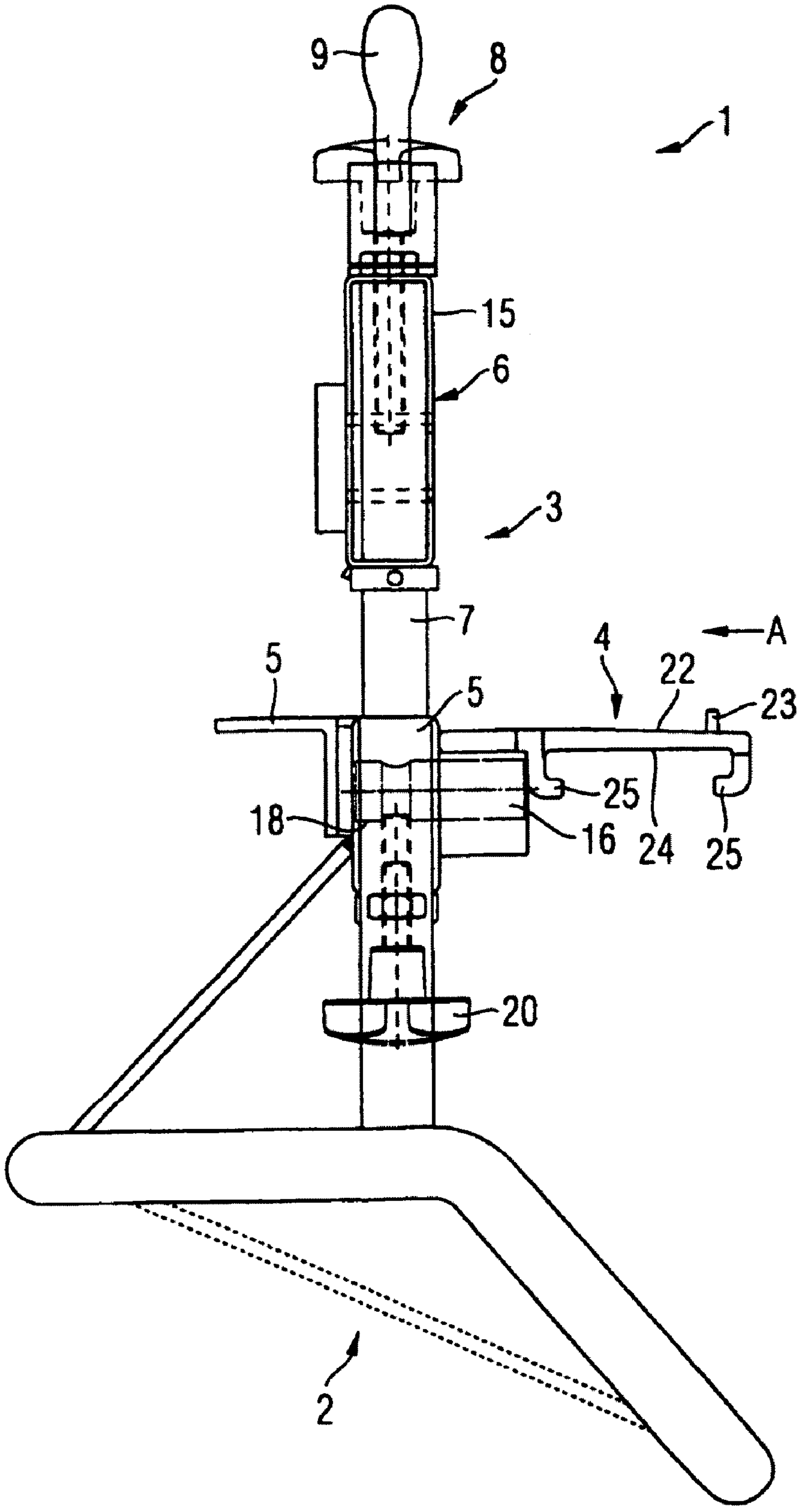
FIG. 2 shows the appliance according to FIG. 1, as seen in the direction of arrow "B" in FIG. 1, FIGS. 3 and 4 show the appliance in a view according to FIGS. 1 and 2, illustrated for a second position of the rail.
Figure 3:
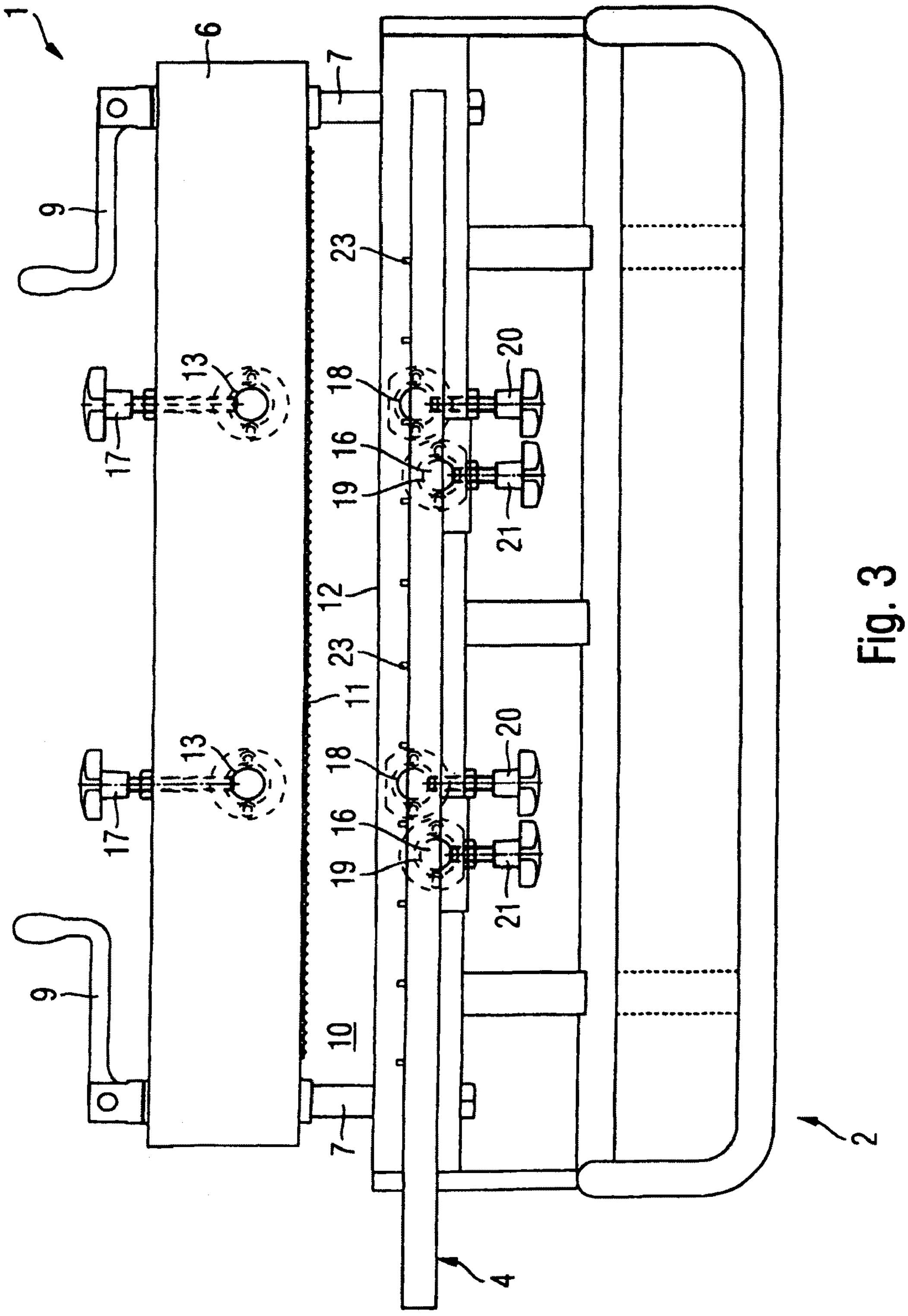
Figure 4:
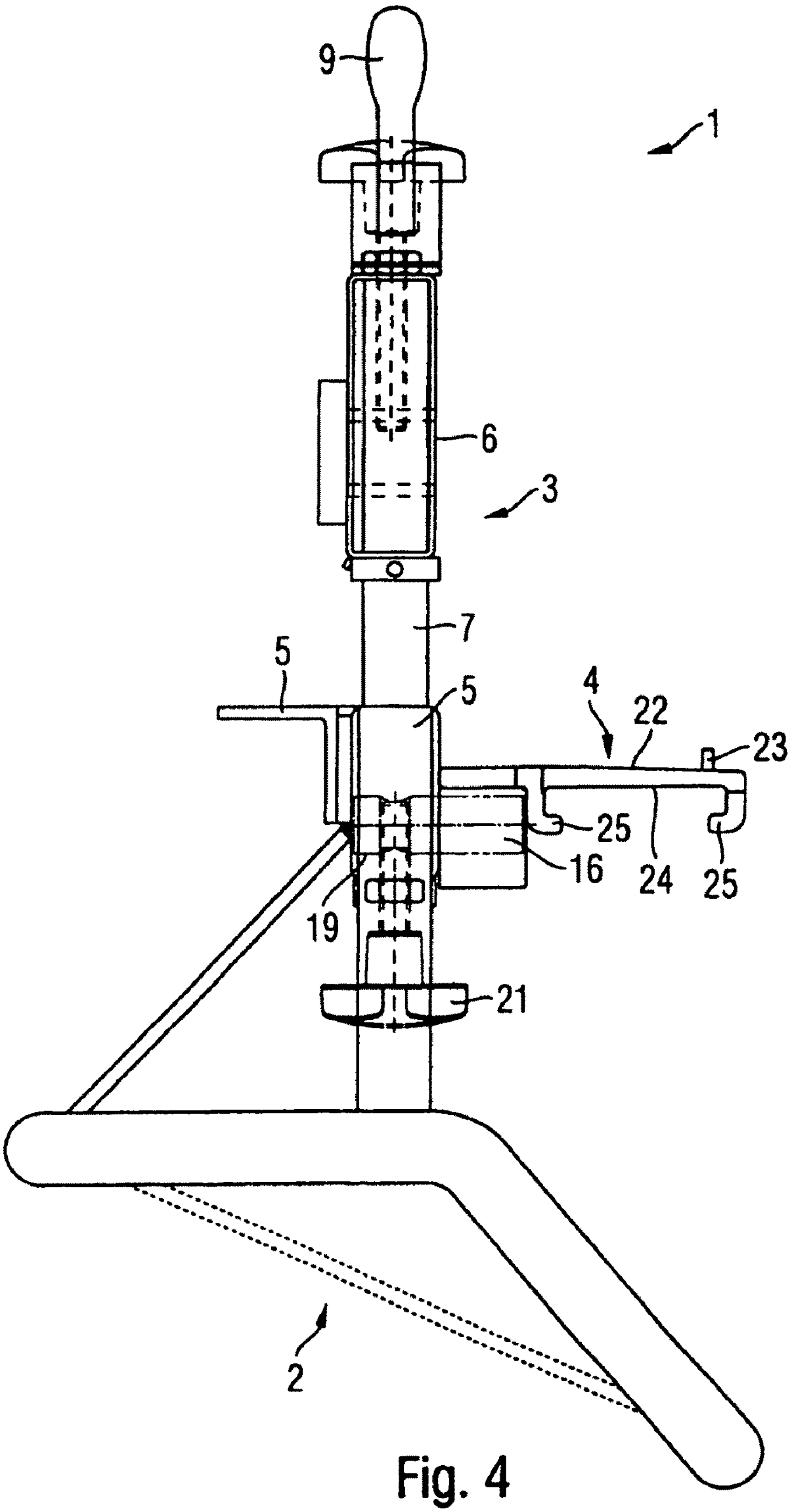
Figure 5:
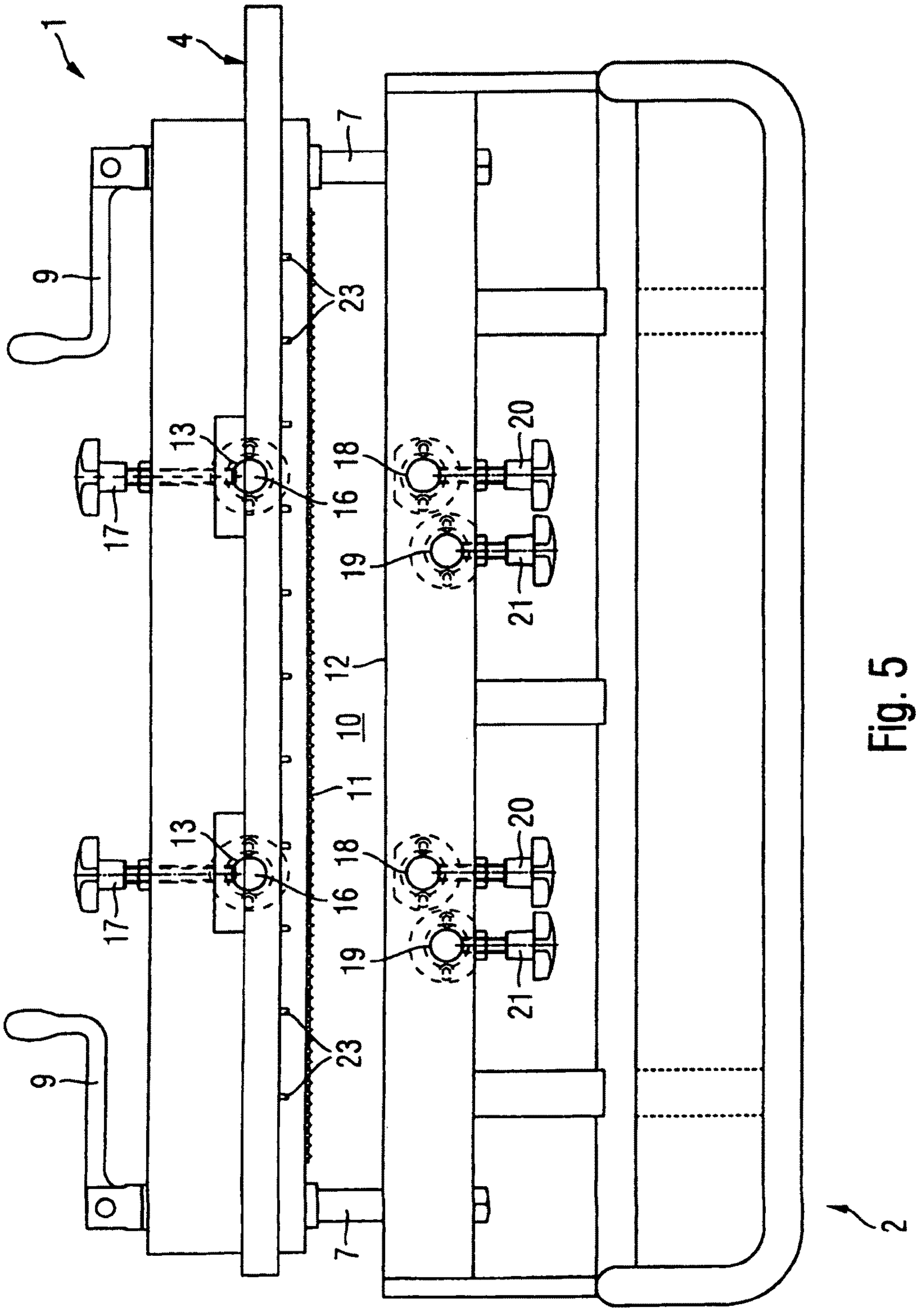
FIGS. 5 and 6 show the appliance in a view according to FIGS. 1 and 2 or 3 and 4, illustrated for a third position of the rail.
Figure 6:
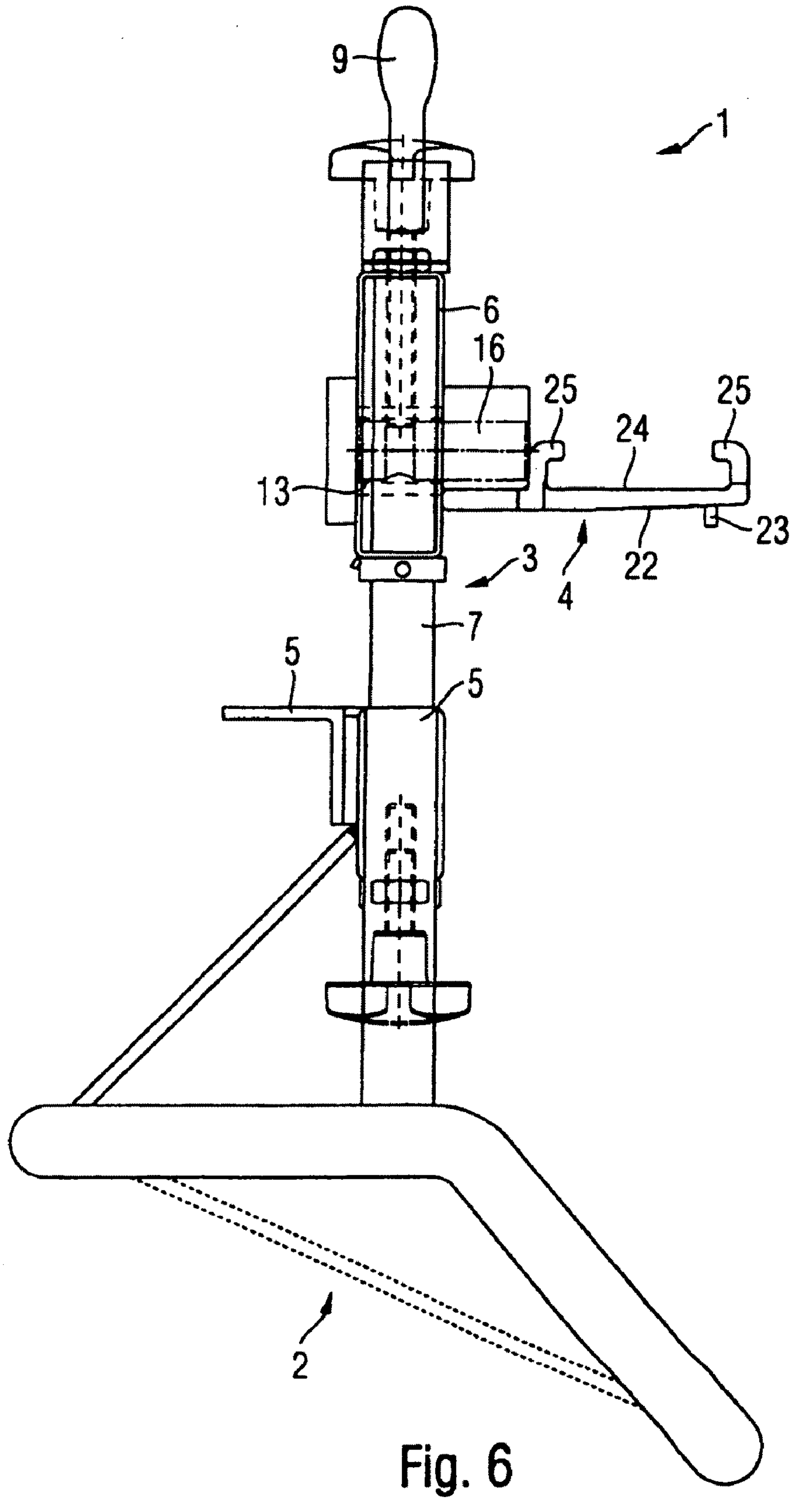

As may be gathered particularly from the illustration of FIGS. 2, 4 and 6, the rail 4 has on its side 22 a multiplicity of stop pins 23 for orienting the conveyor belt in its pushed-in position with respect to these. The rail 4 has, on its side 24 facing away from the side 22, guide extensions 25 directed toward one another, which engage behind a guide shoe 26, illustrated in FIGS. 9, 12, 15 and 18, of the processing device being used. It may be gathered from FIGS. 1 to 6 that the guide extensions 25 are directed downward in positions 1 and 2 and upward in position 3.

FIGS. 7 to 12 illustrate the operation of the appliance for clamping and processing one end of a conveyor belt in the case of the attachment of belt connectors in the upper strand of the conveyor belt.

Figure 7:
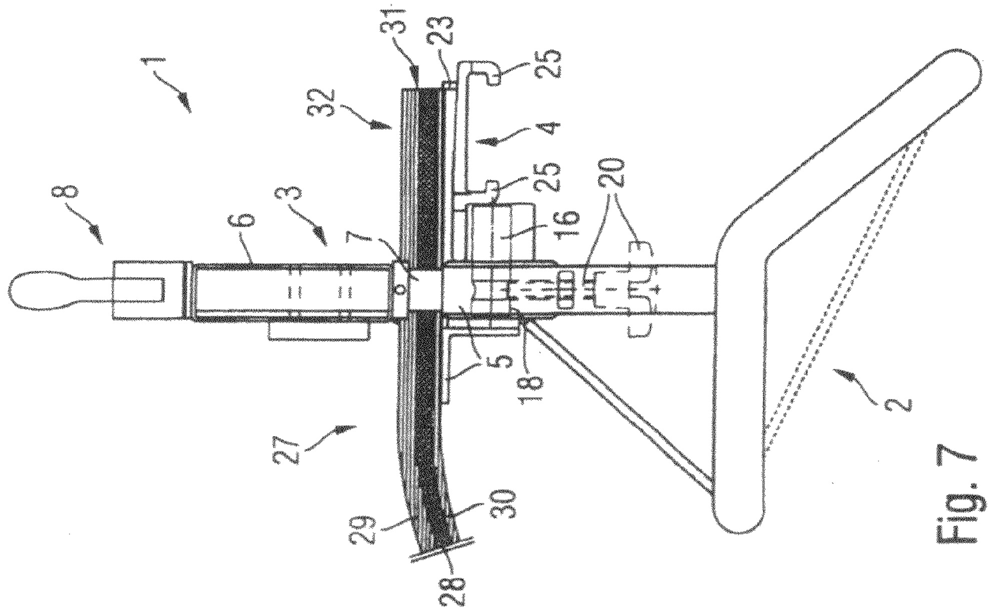

FIG. 7 shows the conveyor belt 27 which is introduced into the appliance 1 and which has a middle layer 28 and an upper covering layer 29, in the case of the upper strand, and also a lower covering layer 30, wherein the thickness of the covering layer 30 is smaller than that of the covering layer 29. The front end face 31 of the conveyor belt 27 has already been cut exactly perpendicularly to the longitudinal extent of the conveyor belt 27 before introduction into the appliance 1.

The stand 2 of the appliance 1 is mounted fixedly. The clamping device 3 is in its open position. In the first step, the free end 32 of the conveyor belt 27 is led or inserted between the lower part 5 and upper part 6 of the clamping device 3 and is oriented with its front end face 31 abutting the stop pins 23 of the rail 4 when rail 4 is located in its first position (according to FIGS. 1 and 2). The upper part 6 is subsequently moved downward by means of the actuating device 8 and the conveyor belt 27 is consequently clamped securely in place. This intermediate state is illustrated in FIG. 7.

Figure 8:
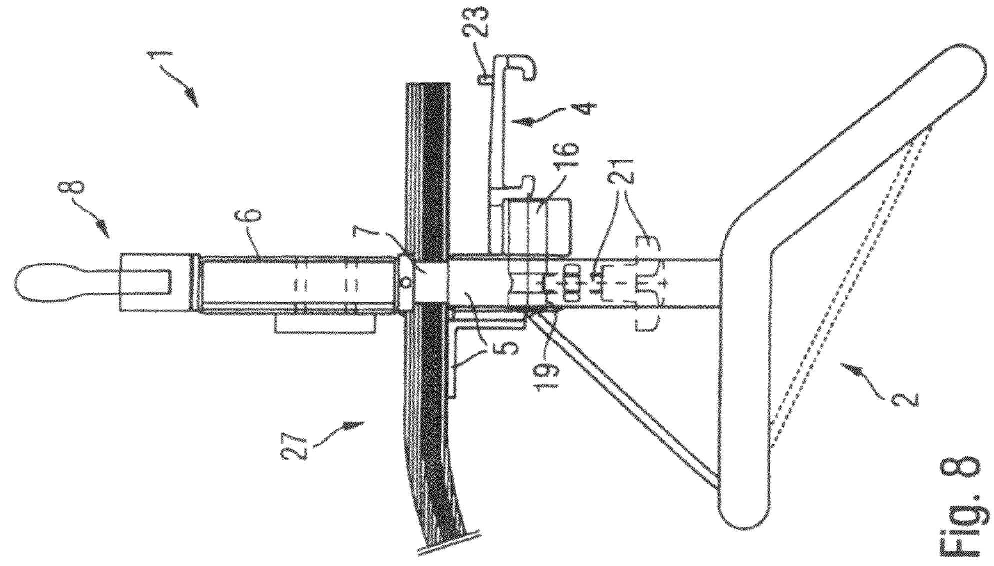
FIGS. 7 to 12 show, in relation to the view according to FIGS. 2, 4 and 6, the method sequence of the appliance during the clamping and processing of one end of the conveyor belt, with the attachment of belt connectors to the upper strand of the conveyor belt.

This first step, which has been explained above, is followed by a second step, comprising the set-up of the appliance 1 for planing or skiving the upper layer or strand 29. In step two, the clamping of the rail 4 is released by releasing the clamping screws 20, and the rail 4 is drawn out of the position according to FIG. 7 and shifted or pushed into position 2. The bearing rods 16 of the rail 4 are therefore introduced into the hole receptacles 19 and are locked in this position by means of the clamping screws 21. This intermediate state is illustrated in FIG. 8.

Figure 9:
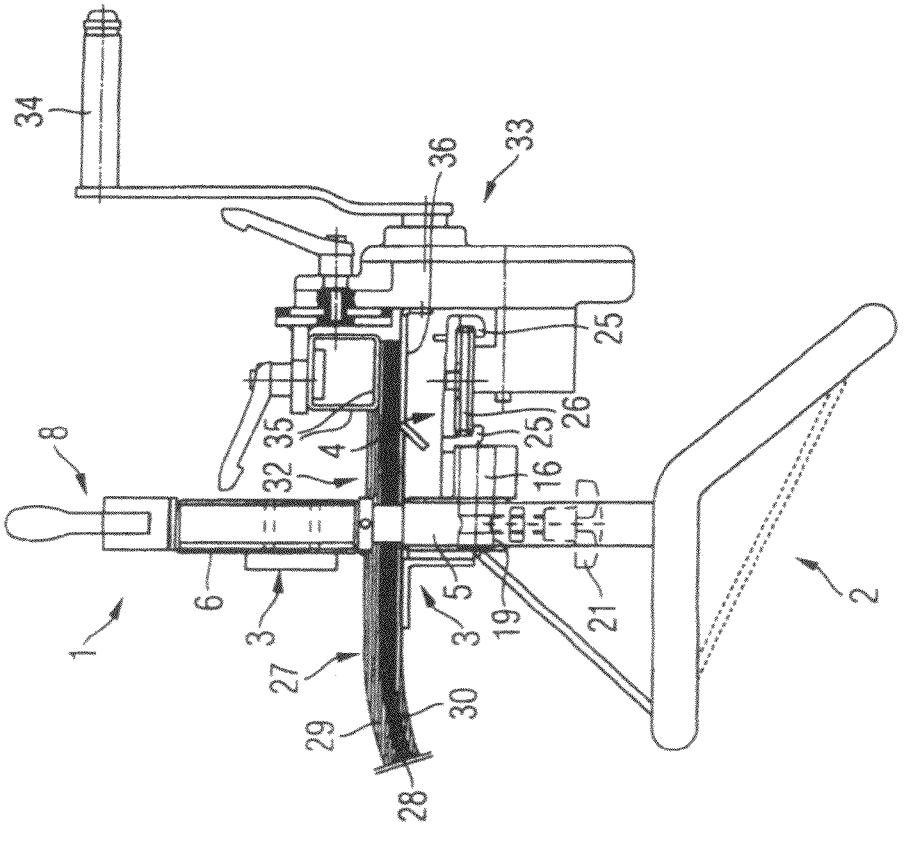

The third step according to FIG. 9 follows the planing of the upper belt layer or strand 29. In position two, the belt plane 33 is pushed with its guide shoe 26 onto the rail 4, in actual fact between the guide extensions 25 of the rail, and can consequently be moved in the longitudinal direction of the guide rail. This belt plane is designed, for example, according to DE 40 02 116 A1; and the relative movement of the belt plane 33 and rail 4 has a gearwheel which cooperates with a rack of the rail 4. Furthermore, a belt plane 33 which is used in this case is known from European Patent Application 06 009 001.6, which was published at a later date. By the gearwheel of the belt plane 33 being actuated by means of a crank handle 34, the belt plane 33 is moved in the longitudinal direction of the rail 4, and the knife 35 of the belt plane 33 separates or severs part of the upper covering layer 29 from the conveyor belt 27. Furthermore, the belt plane 33 is provided with a further knife 35 which, during the movement of the belt plane 33, also separates a region of the lower covering layer 30. This intermediate state is illustrated in FIG. 9.

After the regions of the covering layers 29 and 30 have been planed off, the belt plane 33 is demounted again with respect to the rail 4, hence is removed from the rail 4.

Figure 10:
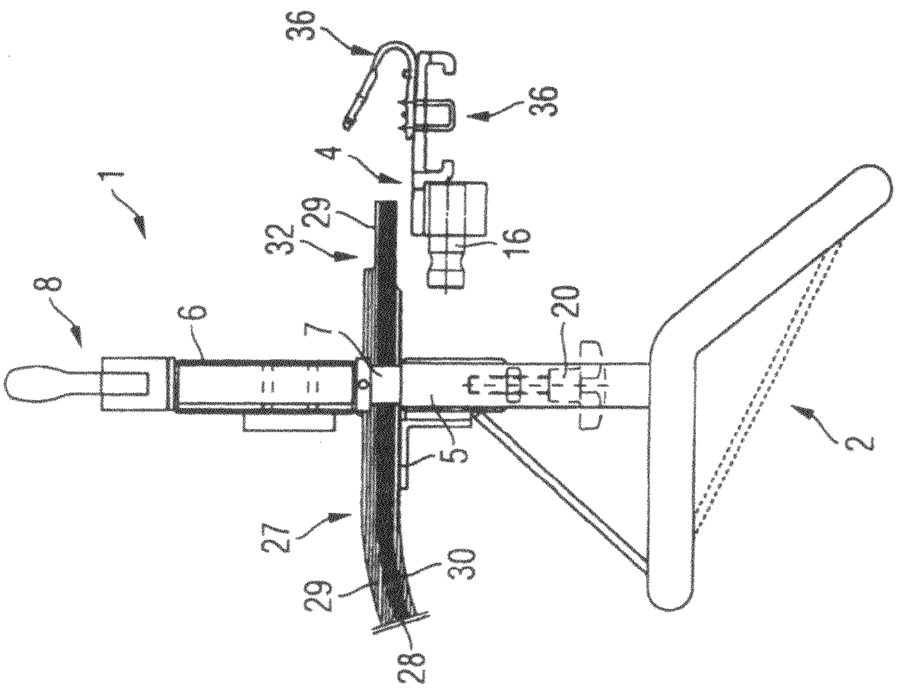

The fourth step, shown in FIG. 10, relates to the resetting of the rail 4 and the insertion of belt connectors 36 into the rail 4. After the release of the clamping screws 21, the rail 4 is demounted from the lower part 5, and the individual belt connectors 36 are inserted into through holes of the rail 4 which are arranged next to one another in the longitudinal direction of the rail 4.

Figure 11:
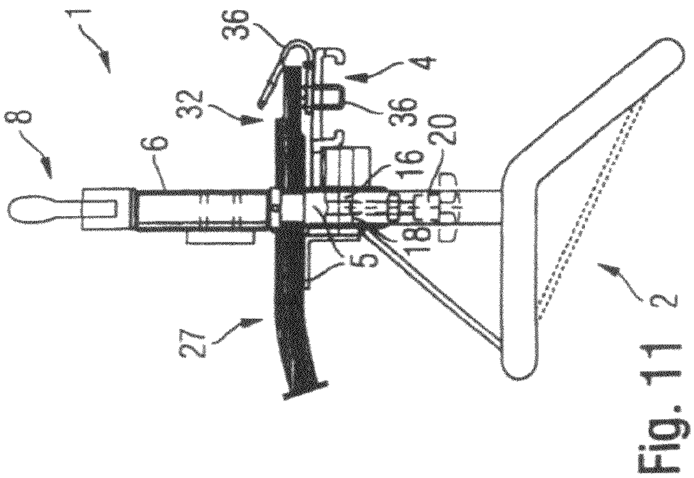
Figure 14:
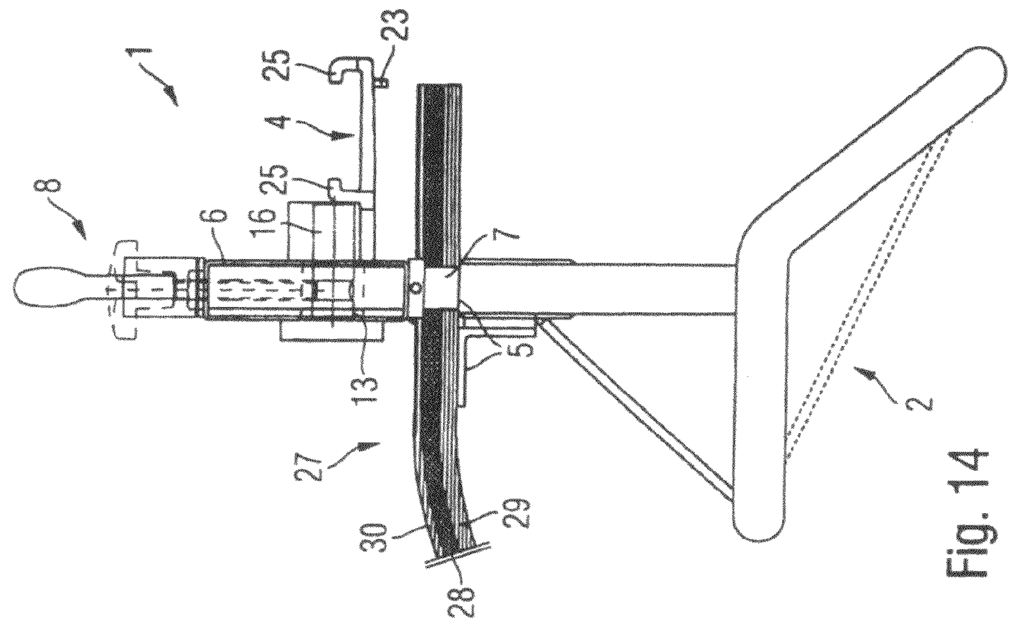
FIGS. 13 to 18 show illustrations corresponding to the illustrations of FIGS. 7 to 12 for the situation where the belt connectors are attached to the lower strand of the conveyor belt.
Figure 13:
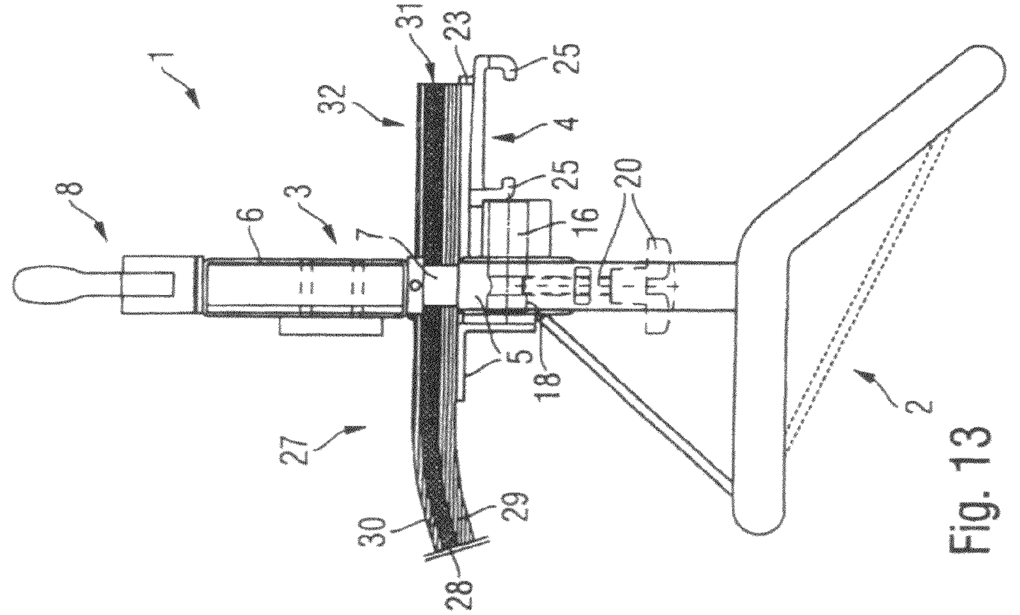
Figure 16:
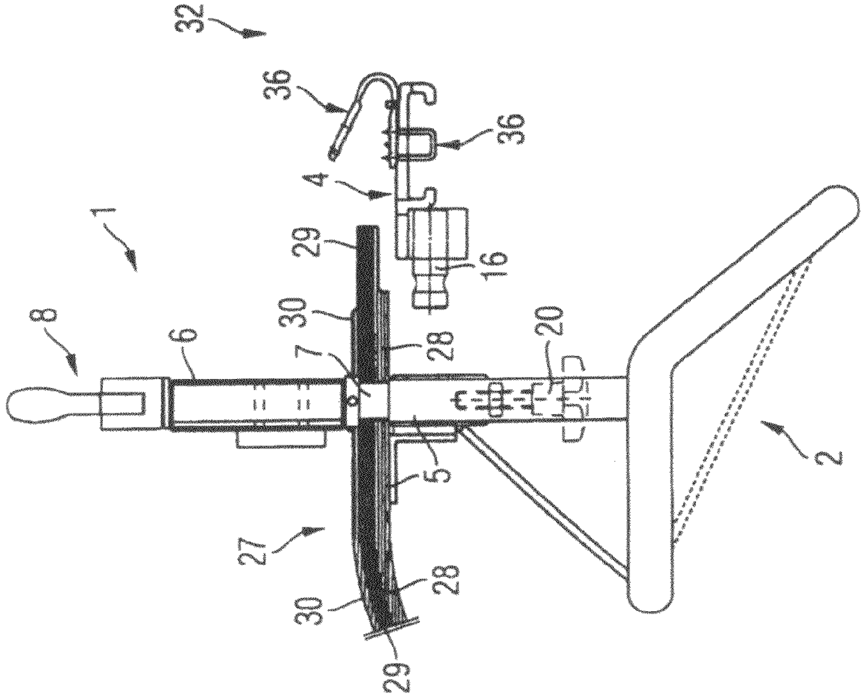
Figure 15:
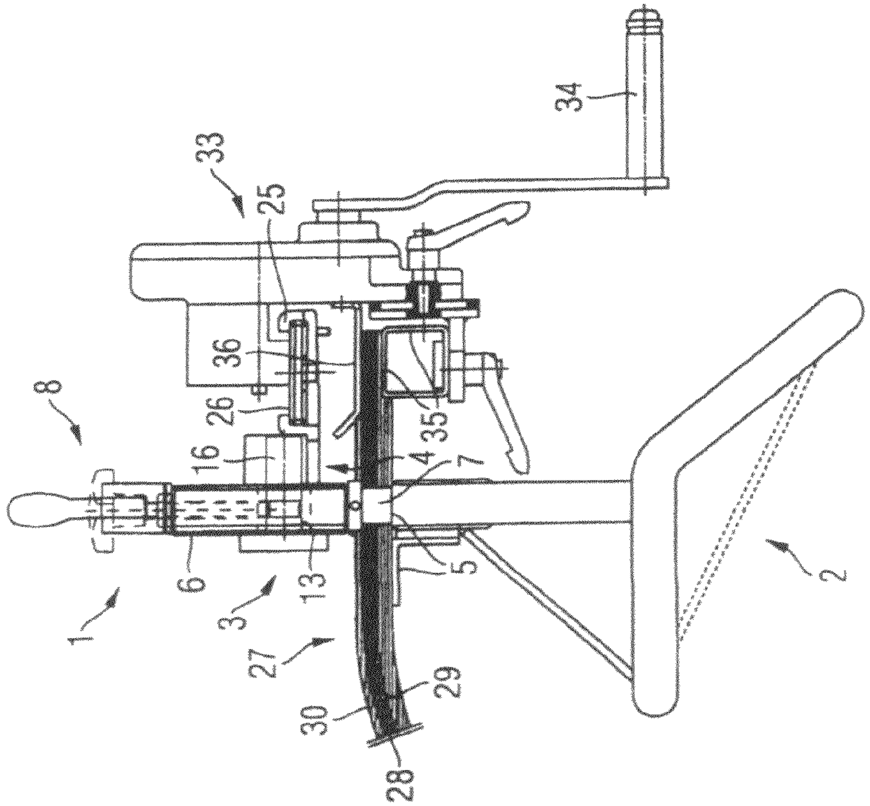
Figure 18:
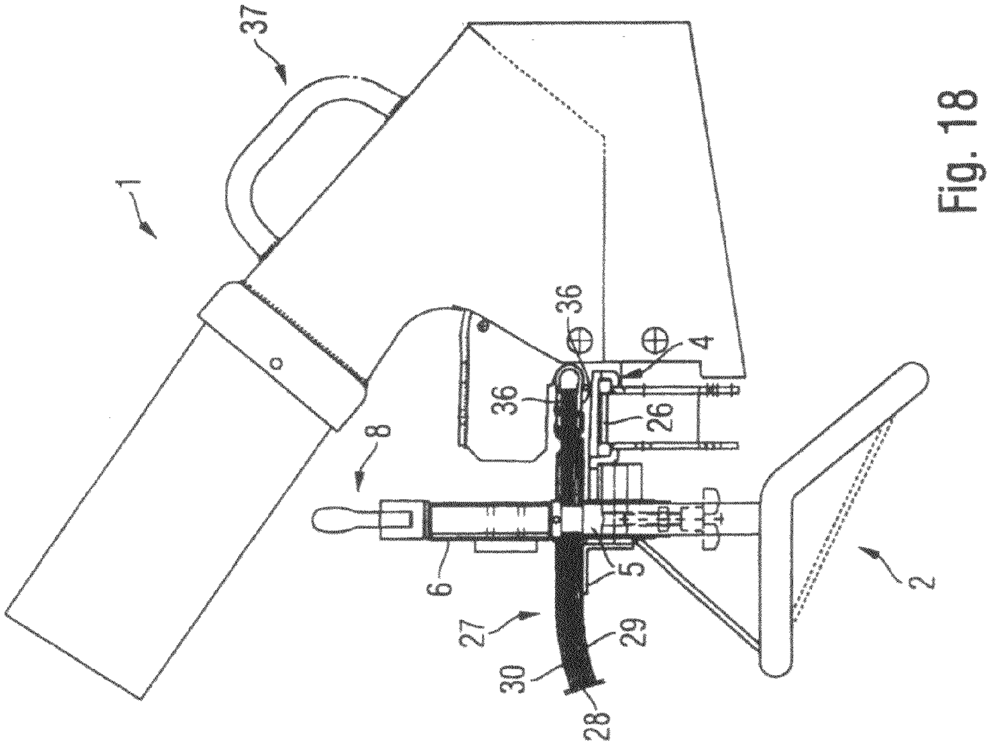
Figure 17:
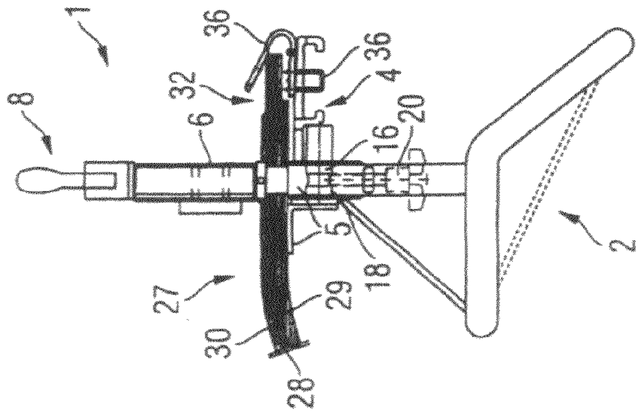

In the fifth step according to FIG. 11, the positioning of the rail 4, together with the belt connectors 36 inserted into the rail 4, takes place in position one in the lower part 5 by the bearing rods 16 of the rail 4 being fixed by means of the clamping screws 20.

Figure 12:
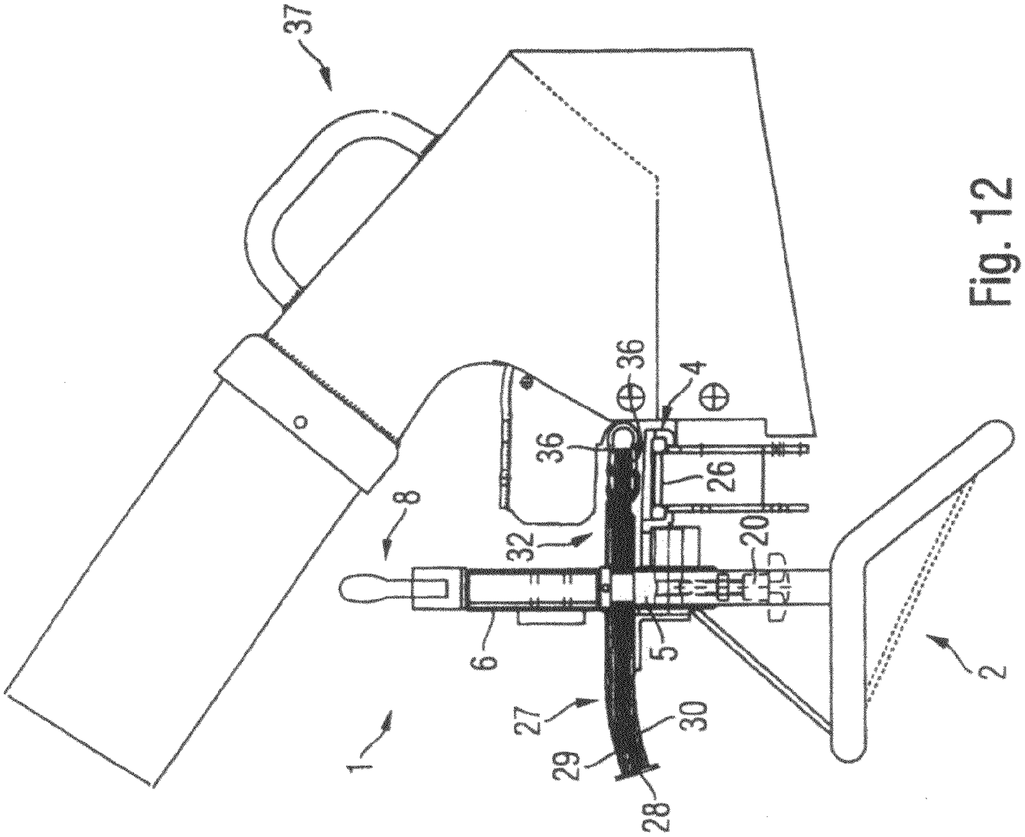

According to the sixth step shown in FIG. 12, a press-in implement 37 for pressing in the belt connectors 36 is pushed with its guide shoe 26 into the rail 4, and the pressing of the belt connectors 36 into the conveyor belt 27 takes place in that region of the free end 32 in which part regions of the covering layers 29 and 30 have been planed off.

FIGS. 13 to 18 illustrate method sequences which correspond to those according to FIGS. 7 to 12. The difference is to be seen in FIGS. 14 and 15 by comparison with FIGS. 8 and 9. In order to make the connection to the lower strand 30 of the conveyor belt, in the second step according to FIG. 14, which corresponds to the second step according to FIG. 8, the rail 4 is not arranged in position 2, but, instead, is rotated through 180 degrees in position 3 in which the rail 4 is connected to the upper part 6. In this position rotated through 180 degrees, the side 22 of the rail 4 is at the bottom and the side 24 of the rail 4 is at the top. In this position of the fixed rail 4 according to the second step shown in FIG. 13, the belt plane 33, as may be gathered from FIG. 15 for the third step, is inserted into the guide rail and planes the two covering layers 29 and 30. In the lower strand, the covering layer 29 is at the bottom and the covering layer 30 at the top.

During the described method sequence of clamping and processing the end of the conveyor belt 27, the clamping of the conveyor belt is preserved by means of the clamping device 3.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. An apparatus for clamping and processing conveyor belt ends, comprising:

a stand member configured to support said apparatus in a generally stationary condition;

a clamping member supported on said stand member, and configured to selectively retain an associated conveyor belt end therein;

a belt processing member configured to process the conveyor belt end retained in said clamping member for interconnecting the same to a like conveyor belt end;

a rail detachably mounted on one of said stand member and said clamping member, and movably supporting thereon said belt processing member for movement of said belt processing member along the conveyor belt end retained in said clamping member; and wherein said rail is configured to be detachably connected to said one of said stand member and said clamping member at first and second different connection positions to adjust the location of said belt processing member relative to the conveyor belt end.

2. An apparatus as set forth in claim 1, wherein:

said belt processing member comprises a belt skiver configured for removing a cover layer from the conveyor belt end.

3. An apparatus as set forth in claim 2, wherein:

said belt skiver comprises a first belt processing member slidably supported on said rail; and including a second belt processing member comprising a press configured for pressing connectors into the conveyor belt end and slidably supported on said rail.

4. An apparatus as set forth in claim 1, wherein:

said belt processing member comprises a press configured for pressing connectors into the conveyor belt end.

5. An apparatus as set forth in claim 1, wherein:

said clamping member includes a lower part, an upper part, and an actuating member which shifts said lower part and said upper part toward one another; and said rail is releasably connected with one of said lower part and said upper part.

6. An apparatus as set forth in claim 5, wherein:

said rail is releasably connected in a single position to said upper part, and is releasably connected in one of two different positions to said lower part.

7. An apparatus as forth in claim 5, wherein:

said lower part is stationary, and said upper part is shiftable; and wherein said actuating member comprises a spindle drive.

8. An apparatus as set forth in claim 1, wherein:

said first connection position of said rail is arranged at a level which corresponds to a bearing level of the conveyor belt retained in said clamping member.

9. An apparatus as set forth in claim 8, wherein:

said second connection position is different from said bearing level of the conveyor belt retained in said clamping member.

10. An apparatus as set forth in claim 9, wherein:

said rail in said second connection position serves for receiving said belt processing member comprising a belt plane for planing upper or lower strands of the conveyor belt.

11. An apparatus as set forth in claim 1, wherein:

one of said stand and said clamping member includes hole receptacles for insertion of bearing rods and connection members for fixing said bearing rods in said hole receptacles.

12. An apparatus as set forth in claim 1, wherein:

said rail includes receptacles for the reception of belt connectors.

13. An apparatus as set forth in claim 1, wherein:

said clamping member includes a lower part, an upper part, and an actuating member which shifts said lower part and said upper part toward one another; and said rail is releasably connected with one of said lower part and said upper part.

14. An apparatus as set forth in claim 13, wherein:

said rail is releasably connected in a single position to said upper part, and is releasably connected in one of two different positions to said lower part.

15. An apparatus as set forth in claim 1, wherein:

said rail is detachably mounted on one of said stand member and said clamping member at a first connection position arranged at a level which corresponds to a bearing level of the conveyor belt retained in said clamping member; and said rail is detachably mounted on one of said stand member and said clamping member in a second or third connection position which is different from the bearing level of the conveyor belt retained in said clamping member.

* * * * *